Patented Feb. 12, 1924.

1,483,414

UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF REGENERATING AMMONIA-SYNTHESIS CATALYSTS.

No Drawing.     Application filed January 3, 1922.   Serial No. 526,662.

*To all whom it may concern:*

Be it known that I, JOHN COLLINS CLANCY, a subject of the King of Great Britain, residing at Providence, in the county of Providence and State of Rhode Island, have invented certain new and useful Improvements in Processes of Regenerating Ammonia-Synthesis Catalysts, of which the following is a specification.

This invention relates to the process of regenerating an ammonia synthesis catalyst, and is particularly adapted for use in connection with catalysts formed from or including a cyanid or cyanamid of an alkalinous metal, and those catalysts formed from or containing a mixture of cyanids or cyanamids of alkalinous metals.

The principal object of my invention relates to the regeneration of ammonia synthesis catalysts of the class described whereby the catalysts when spent or fatigued by long continued use may be restored to approximately their original activity without making it necessary to remove the catalytic mass from the working autoclave and replace the same with fresh material.

Other objects and advantages of the invention relate to certain novel steps and combinations of steps employed as well as the use of certain materials and substances employed as will be more fully set forth in the detailed description to follow.

I have found that when catalysts formed from or containing cyanids or cyanamids of the alkalinous metals, (such for example as those formed from either simple or complex alkali or alkali earth metal cyanids, carbonates, oxids, hydroxides or the organic salts thereof by heating such materials or mixtures thereof in an atmosphere of nitrogen, nitrogen and hydrogen, or ammonia; or catalysts prepared in any other suitable manner to contain either simple or complex alkalinous metal cyanamids) eventually become spent or fatigued when employed as catalysts for the synthesis of ammonia from its elements, due probably in part to the presence of slight traces of moisture in the gases to be synthesized, so that after a time the catalysts lose their efficiency and it has heretofore been necessary to remove the catalysts thus "spent" or "fatigued" and replace them with freshly prepared material. This occasions a considerable loss of time and expenditure of labor in removing the spent catalyst from the contact chamber as well as the loss of the spent materials and the interruption to the synthesizing operation.

By passing dry ammonia gas into the contact chamber and into contact with the spent portions of the catalyst either alone or in the presence of small quantites of dry acetylene gas it is found that a reaction takes place between the ammonia gas and the spent portions of the catalyst under the influence of the heat maintained in the contact chamber (300—600° C.) whereby the catalyst recovers to a considerable extent its original catalytic efficiency.

This regeneration may be effected by cutting off the flow of the nitrogen-hydrogen gases, mixed in proper proportions for combining to form ammonia, and passing a current of anhydrous ammonia through the autoclave for a sufficient time to restore the catalyst to approximately its original efficiency; or the regeneration may be accomplished by returning the gases which have already passed through the synthesizing chamber from which a portion only of the ammonia content has been removed and combining these gases with the incoming nitrogen-hydrogen gases prior to passing the incoming gases through the autoclave. In the case last mentioned the ammonia gas will be present in much smaller proportions than in the case where the nitrogen-hydrogen gases are cut off from the autoclave and anhydrous ammonia passed therethrough, but I find that even this smaller proportion of ammonia is capable of effecting the regeneration of the catalyst, and the presence of the small ammonia content in the nitrogen-hydrogen mixture interferes in no way with the synthesizing operation.

As an alternative method of procedure I may pass anhydrous ammonia gas mixed with a proportionately small quantity of acetylene gas into the autoclave and into contact with spent portions of the catalyst. A ready means of accomplishing the regeneration of the catalyst by means of a mixture of dry ammonia and acetylene gases consists in the use of a metal carbide as a drying agent for the gases to be synthesized whereby traces of moisture contained in the gases react upon the carbide to form acetylene which passes along with the nitrogen-hydrogen mixture into the synthesizing autoclave and, if a portion of the ammonia formed during the synthesizing operation is permitted to return with that portion of the nitrogen-hydrogen mixture which remains uncombined after passing through the synthesizing chamber and mix with the fresh nitrogen-hydrogen mixture to again pass through the synthesizing chamber both ammonia and acetylene gases will be present in the gases contacting with the catalyst to regenerate spent portions thereof. Just what action is produced by the presence of acetylene gas in effecting the regeneration of the catalyst is not clear but I find that the ammonia present acts more efficiently in effecting its regenerative function when it is combined with small quantities of acetylene gas.

While I have found that calcium carbide and barium carbide are particularly advantageous for use as metal carbides for the drying of the gases and the production of acetylene gas as above described I employ the term metallic carbide throughout the specification and claims as covering these or other metallic carbides of this general character which are capable of reacting with water to give off acetylene gas.

When acetylene is used as one of the regenerative agents it is desirable that an excess of ammonia be present with the acetylene gas and this will naturally result as normally only minute traces of acetylene are formed in eliminating the moisture from the gases to be synthesized.

Just what chemical reactions occur in the catalyst during the synthesizing operation to cause the lowering of its efficiency, or in the process of regeneration of the same I am unable to state positively, but I have found (actually) that during the preliminary treatment for activating the catalyst a portion at least of the material is changed into a cyanamid which is particularly efficient as a catalyst. Continued synthesis of ammonia by means of the catalyst and contact by oxygen or traces of moisture in the gases changes, I believe, a portion of the cyanamid to a carbonate, which, during the process of regeneration is again converted to a cyanamid with the consequence that the catalytic material regains approximately its initial efficiency as long as the synthesizing gases are dry. The regeneration of the catalyst, either by means of ammonia gas alone or by means of ammonia gas mixed with small quantities of acetylene gas, is preferably accomplished under pressure and at an elevated temperature, the temperature and pressure employed being capable of variation, but preferably approximately the same as are used in the synthesizing operation, namely, temperatures of from 300°—600° C. and pressures ranging from 100 to 1000 atmospheres.

The term "alkalinous metal" as used in the specification and claims is employed generically to designate an alkali or alkali earth metal, the term being intended to cover broadly all elements ordinarily classified under the head of alkali metals or alkali earth metals.

While I have described my improved process with considerable particularity in order to make the mode of operation and the preferred sequence of steps and combinations of steps clear to those skilled in the art, it is to be understood that I do not desire or intend to be limited to the precise combination or sequence of steps described as preferred except as the same may be properly included within the scope of the following claims when broadly construed in the light of my invention.

This case is a continuation in part of my copending applications Serial No. 455,352 filed March 24, 1921, and Serial No. 456,401 filed March 28, 1921.

Having described my invention, what I claim is:

1. The process of regenerating an ammonia synthesis catalyst which comprises reacting upon said catalyst with dry ammonia gas.

2. The process of regenerating an ammonia synthesis catalyst which comprises reacting upon said catalyst with dry ammonia gas under pressure and at an elevated temperature.

3. The process of regenerating an ammonia synthesis catalyst containing an alkalinous metal cyanamid which comprises reacting upon said catalyst with dry ammonia gas.

4. The process of regenerating an ammonia synthesis catalyst containing an alkalinous metal cyanamid which comprises reacting upon said catalyst with dry ammonia gas under pressure and at an elevated temperature.

5. The process of regenerating an ammonia synthesis catalyst which comprises reacting upon said catalyst with dry ammonia gas in the presence of a gaseous hydrocarbon.

6. The process of regenerating an ammonia synthesis catalyst which comprises reacting upon said catalyst with dry ammonia gas in the presence of acetylene.

7. The process of regenerating an ammonia synthesis catalyst which comprises reacting upon said catalyst with dry ammonia gas in the presence of a gaseous hydrocarbon under pressure and at an elevated temperature.

8. The process of regenerating an ammonia synthesis catalyst which comprises reacting upon said catalyst with dry ammonia gas in the presence of acetylene under pressure and at an elevated temperature.

9. The process of regenerating an ammonia synthesis catalyst which comprises reacting upon said catalyst with dry ammonia gas under pressure.

10. The process of regenerating an ammonia synthesis catalyst which comprises reacting upon said catalyst with dry ammonia gas at an elevated temperature.

11. The process of regenerating an ammonia synthesis catalyst which comprises reacting upon said catalyst with ammonia gas in the presence of acetylene and under pressure.

12. The process of regenerating an ammonia synthesis catalyst which comprises reacting upon said catalyst with ammonia gas in the presence of acetylene and at an elevated temperature.

In testimony whereof I have affixed my signature.

JOHN COLLINS CLANCY.